United States Patent [19]
Moore

[11] Patent Number: 4,688,739
[45] Date of Patent: Aug. 25, 1987

[54] COILED MEMBER SUPPORT AND RETENTION APPARATUS

[76] Inventor: Edward K. Moore, 422 Los Encinos Ave., San Jose, Calif. 95134

[21] Appl. No.: 889,660

[22] Filed: Jul. 28, 1986

[51] Int. Cl.$^4$ .......................................... B65H 75/36
[52] U.S. Cl. ...................................... 242/85.1; 242/96
[58] Field of Search ................... 242/85.1, 96, 125.1, 242/125.2, 125.3; 191/12 R, 12.2 R, 12.4; 24/115 F, 115 H, 115 K, 129 R, 129 B, 71.1, 71.2, 71.3; 248/49, 65, 76, 304–306

[56] References Cited

U.S. PATENT DOCUMENTS

| | | | |
|---|---|---|---|
| D. 237,459 | 11/1975 | Wagner | D8/220 |
| 1,058,925 | 4/1913 | Toegel | 242/85.1 |
| 2,469,103 | 5/1949 | Carlson | 242/85.1 |
| 2,470,212 | 5/1949 | Carlson | 242/85.1 |
| 2,678,778 | 5/1954 | Gibson | 242/85.1 |
| 2,746,112 | 5/1956 | Simon | 24/129 B |
| 2,778,582 | 1/1957 | Arthur | 242/85.1 |
| 3,485,468 | 12/1969 | Schweitzer | 24/129 B |
| 4,062,430 | 12/1977 | Momberg | 242/85.1 X |
| 4,123,012 | 10/1978 | Hough | 242/85.1 |
| 4,261,529 | 4/1981 | Sandberg et al. | 242/85.1 |
| 4,497,457 | 2/1985 | Harvey | 242/96 |

FOREIGN PATENT DOCUMENTS 2528250 12/1983 France ................... 242/85.1

*Primary Examiner*—John M. Jillions

[57] ABSTRACT

A coiled member storage and retrieval apparatus (10) in combination with a coiled member (100) having enlarged terminal members (101) formed on both ends; wherein the apparatus (10) comprises a framework unit (11) which forms a handle unit (12) and a storage unit (11); wherein, the storage unit (11) comprises an elongated slot (17) whose opening (17') is normally obstructed by a retractable detent unit (14) that controls the insertion and removal of the intermediate portions of the coiled member (100) relative to the storage unit (11).

1 Claim, 3 Drawing Figures

COILED MEMBER SUPPORT AND RETENTION APPARATUS

TECHNICAL FIELD

The present invention relates generally to apparatus for storing and feeding coiled members.

BACKGROUND OF THE INVENTION

The prior art is replete with diverse structural arrangements that have been developed specifically for the purpose of storing, transporting and/or paying out coiled members such as cords, rope, line, or the like.

Examples of these prior art constructions may be seen by reference to the following U.S. Pat. Nos. 4,261,529; 4,123,012; 4,497,457; and Des. Pat. No. 237,459.

Briefly stated these prior art patents rely for their operation on two widely spaced surfaces formed as part of a support framework; wherein, the widely spaced surfaces are wrapped with the coils of rope, cord or the like for storage purposes. In addition the prior art constructions are occasionally provided with one or more cord terminal capture elements, whereby the ends of the coiled loop will be retained in the storage mode.

Basically the prior art constructions are only adequate for their intended function, and as a practical matter these constructions are extremely inefficient in a number of respects. In practice these structures require that the cord be wound onto the framework for storage, and unwound in the opposite direction to utilize the uncoiled member for its intended purpose and function.

Obviously there was a pressing need to develop a new type of coil storage structure that would produce the desired purpose and function of the prior art devices; but, which would also accomplish these objectives in a far simpler and much more efficient manner.

Once this need was recognized, it provided the impetus that spurred the development of the new and unique structure that forms the basis of the present invention.

BRIEF SUMMARY OF THE INVENTION

The present invention involves a coil storage and retrieval apparatus which comprises in general a framework unit forming an elongated storage unit and a handle unit, wherein the insertion and removal of a coiled member relative to the elongated storage unit is governed by a retractable detent unit.

As will be explained in greater detail further on in the specification, the particular arrangement and cooperation of the aforementioned units that comprise the coil storage and feeding apparatus of this invention, produces a device that only requires one support surface to effect the suspended storage of a coiled member; and, further provides a coil storage and retrieval apparatus that permits the straight line feeding of the coiled member from within the storage unit.

As mentioned earlier, all of the known prior art constructions require at least two widely spaced support surfaces to effect the winding of the coiled member onto their respective storage means, and further require relative rotational movement of the coiled member with respect to the storage means to effect the unwinding or retrieval of the coiled member for use.

BRIEF DESCRIPTION OF THE DRAWINGS

These and other objects advantages and novel features of the invention will become apparent from the detailed description of the best mode for carrying out the preferred embodiment of this inveniton which follows; particularly when considered in conjunction with the accompanying drawings; wherein.

BEST MODE FOR CARRYING OUT THE INVENTION

Figure 1:
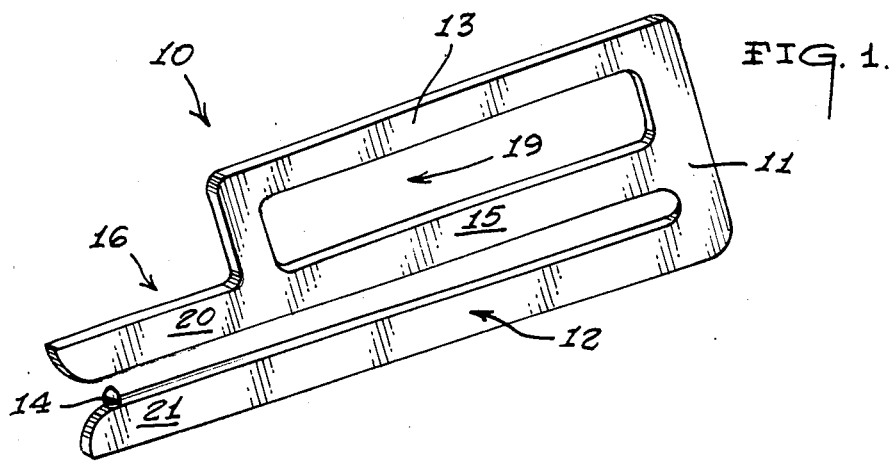
FIG. 1 is an isolated perspective view of the coil storage and retrieval apparatus of this invention.

As can best be seen by reference to FIG. 1, the coiled member storage and retrieval apparatus that forms the basis of the present invention is designated generally by the reference numeral (10). The coiled member storage and retrieval apparatus (10) comprises in general a framework unit (11) which forms an elongated storage unit (12) and a handle unit (13); wherein the entrance to the storage unit (12) is controlled by a retractable detent unit (14). These units will now be described in seriatim fashion.

Figure 2:
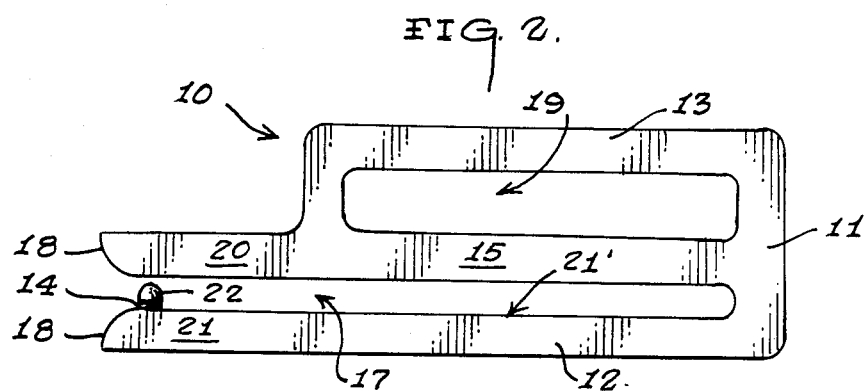
FIG. 2 is a front elevational view of the apparatus.

As shown in FIGS. 1 and 2, the framework unit (11) comprises a generally flat profile one piece apertured framework member (15) having a generally open rectangular configuration. As can best be seen in FIG. 2 the lower portion of the framework member (15) is provided with an extension element (16) whose purpose and function will be explained shortly.

The elongated storage unit (12) which is formed as part of the framework unit (11), comprises an elongated narrow slot (17); whose slot opening (17') originates in the framework extension element (16); and whose effective length extends across the lower portion of the framework unit (11); wherein the elongated slot terminates as at (17"), proximate the side of the framework member (15) opposite the extension element (16).

Figure 3:
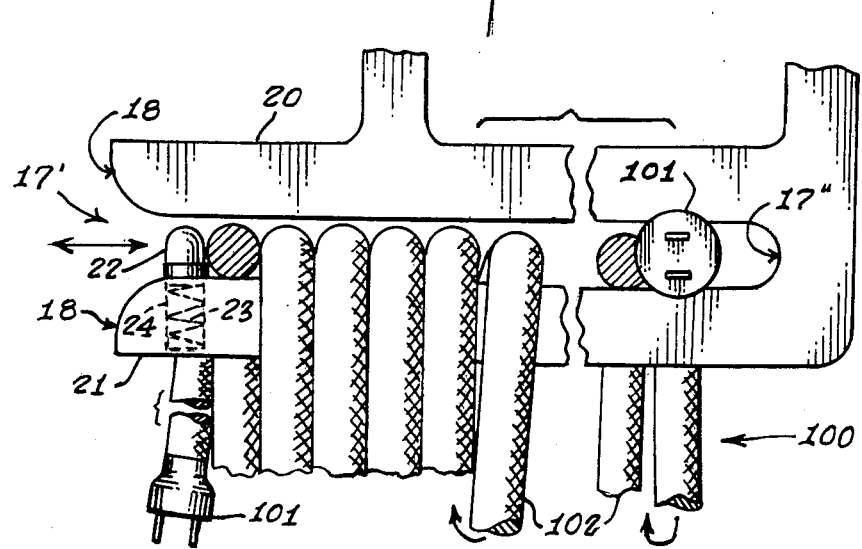
FIG. 3 is an enlarged detail view of the apparatus used to store a coiled member.

As best shown in FIGS. 2 and 3, the slot opening (17') is defined by outwardly curved surfaces (18) formed on the extension element (16). These curved surfaces (18) are provided to serve as guide means to facilitate the insertion of a coiled member (100) into the elongated narrow slot (17).

The handle unit (13) is also formed as part of the framework unit (11), and comprises an enlarged aperture (19) formed in the upper portion of the framework member (15). As shown in the drawings the enlarged handle aperture (19) has a generally rectangular configuration; wherein, the bottom of the rectangular opening is generally aligned with the top of the extension element (16).

Referring now to the left hand side of FIGS. 1 thru 3, it can be seen that the elongated slot (17) creates an upper (20) and a lower (21) arm member in the extension element (16), and the lower portion of the framework unit (11).

As can best be seen by reference to FIG. 3, the retractable detent unit (14) is disposed on one of the arm members (20,21) proximate the elongated slot opening (17'), whereby the detent unit (14) will control the insertion and removal of a coiled member (100) relative to the coil storage capacity of that portion of the elongated slot disposed inboard from the location of the detent unit (14).

Again referring to FIG. 3, it can be seen that the detent unit (14) comprises a detent member (22) operatively connected to a spring element (23) which is disposed in a recess (24) formed in one of the extension element arm members (20,21). As depicted in FIG. 3, the detent member (22) is normally biased by the spring element (23) into a blocking obstruction of the interior portion of the elongated slot (17).

When it is desired to insert or remove a coiled member (100) relative to the storage chamber portion of the elongated slot (17), the detent member (22) may be manually or otherwise forceably depressed to allow ingress and egress of the coiled member (100) relative to the elongated slot (17).

As shown in FIG. 3, the coil storage and retrieval apparatus (10) of this invention was designed primarily to accommodate coiled members (100) having enlarged terminal member (101) formed on either end, such as would be found on an electrical cord, a garden hose, or the like.

As a consequence of the foregoing considerations, the elongated slot (17) is dimensioned such that the width of the slot is less than twice the diameter of the intermediate portion of the coiled member; so as to form a narrow opening that will slidingly accommodate single sequential loops (102) of the running length of the coiled member (100); but, will not accommodate passage of the terminal elements (101) through the elongated slot opening.

The operation of the coil storage and retrieval apparatus (10) proceeds as follows: One end of the coiled member (100) and its associated terminal element (101) are positioned adjacent to the elongated slot opening (17') with the terminal element (101) being disposed to one side of the apparatus. The coiled member is forced against the detent member (22) to overcome the spring biasing and allow passage of the reduced diameter portion of the coiled member (100), within the elongated slot (17).

At this juncture the coiled member (100) is inserted in successive loops (102) until the other terminal element (101) comes into close proximity to the other side of the apparatus (10), whereby the reduced diameter portion of the coiled member (100) closest to the last mentioned terminal element (101) is held captive in the interior portion of the elongated slot (17) by the detent member (22).

When the coiled member (100) is required to be retrieved from storage, the outboard terminal member (101) is grasped and pulled to overcome the spring bias of the detent member (22). Continued application of force on the free end of the coiled member (100) will result in the paying out in one direction of successive loops (102) of the coiled member (100) until the entire coiled member (100) has been extracted from the elongated slot (17).

It should also be appreciated at this juncture, that due to the unique structural configuration embodied in the apparatus (10) that has heretofore been described; the coiled member (100) relies solely upon the contact of the individual coil loops (102) with the upper surface (21') of the lower arm element (21) for the suspension support of the coiled member.

Having thereby described the subject matter of this invention, it should be apparent that many substitutions, modifications and variations of the invention are possible in light of the above teachings. It is therefore to be understood that the invention, as taught and described herein, is only to be limited to the extent of the breadth and scope of the appended claims.

I claim:

1. A coiled member storage retrieval apparatus in combination with a coiled member having enlarged terminal members formed on both ends; wherein, the apparatus consists of:

a framework unit comprising a generally flat profile one piece apertured framework member having a generally open rectangular configuration forming a handle unit and an elongated storage unit wherein the elongated storage unit comprises a narrow elongated slot formed in the framework unit; wherein the opening of the elongated slot is provided with rounded edges and the elongated slot is dimensioned such that the width of the slot is less than twice the diameter of the intermediate portion of the coiled member to slidingly receive only the intermediate portions of the coiled member, while preventing the lateral passage of the enlarged terminal members of the coiled members through the elongated slot; and, the framework unit is further provided with a retractable detent unit positioned proximate the opening of the elongated slot, wherein the detent unit is normally biased into a blocking obstruction of the elongated slot with respect to the insertion and removal of the coiled member relative to the elongated slot; wherein, the retractable detent unit comprises a detent member operatively connected to a spring element which is disposed in a recess formed in the said framework unit.

* * * * *